Dec. 23, 1958  G. C. FIELDS  2,865,395
FLOW CONTROL VALVE
Filed May 24, 1956
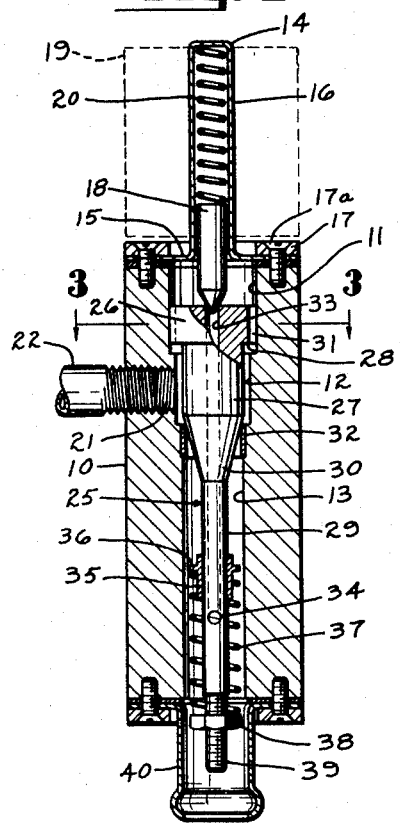
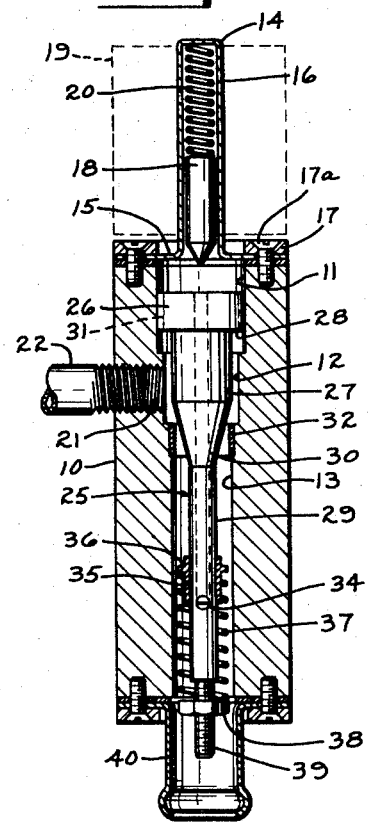
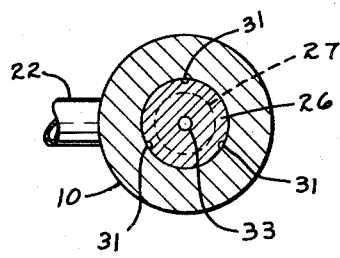
INVENTOR
George C. Fields
BY
H. J. Johnston
ATTORNEY

United States Patent Office 2,865,395
Patented Dec. 23, 1958

2,865,395

FLOW CONTROL VALVE

George C. Fields, Wilmette, Ill., assignor to Scovill Manufacturing Company, Waterbury, Conn., a specially chartered corporation of Connecticut Application May 24, 1956, Serial No. 587,029

5 Claims. (Cl. 137—486)

My invention relates to a flow control valve which may be useful for a variety of purposes but which is especially suited for automatic washing machines.

Washing machines are used with a wide range of water pressures and when controlled by a timing device it is important to control the rate of flow so that it will be uniform regardless of the pressures encountered.

While various attempts have been made to solve this problem no fully satisfactory flow control valve has yet been devised which will be sensitive enough to give uniform rate of flow over the wide variety of water pressures to which washing machines may be connected.

According to my invention the fluid sensing device which is responsive to the rate of flow of water through the valve does not directly operate the main control valve, but rather controls a fluid pressure actuated device which in turn controls the main valve. This permits the employment of a much lighter and more sensitive fluid sensing member.

Other features and advantages will be apparent from the following detailed description taken along with the accompanying drawing, wherein:

Fig. 1 is a central vertical section showing my invention embodied in a flow control valve with the valve closed.

Fig. 2 is a similar view to Fig. 1 showing the valve open, and

Fig. 3 is a cross sectional view taken along the line 3—3 of Fig. 1.

My invention is shown in conjunction with a solenoid actuated device for initiating the operation of a valve such as used in automatic domestic washing machines. It is to be understood, however, that my novel valve will be readily adapted for use in various types of apparatus where it is desired to obtain a given amount of fluid in a given length of time irrespective of the fluid supply pressures.

In the drawing the numeral 10 designates a valve casing or body having a longitudinal opening therethrough divided into three separate chambers, an upper larger diameter chamber 11, an intermediate or inlet chamber 12 of reduced diameter, and an elongated fluid delivery or outlet chamber 13 of still smaller diameter. The upper end of the larger chamber 11 is closed by a cap member 14 consisting of a flange 15 and an elongated closed end sleeve 16. The flange 15 is seated and suitably sealed against the upper surface of the body 10 and made secure thereto as by a clamping ring 17 and screws 17a. The sleeve 16 is axially aligned with the chamber 11 and serves to house and guide the magnetic plunger or pilot valve 18 operated by a solenoid 19 against the influence of a spring 20.

The body 10 is provided with a tapped hole 21 leading into the inlet chamber 12 and to which an inlet pipe 22 may be threaded. The valve for controlling the flow of fluid through the body may be a single piece elongated floating member 25 consisting of a piston 26, an intermediate reduced section 27 with a shoulder 28 therebetween providing an annular area subjected to inlet pressures. The section 27 is joined to a relatively smaller stem 29 with an interposed tapered valve 30 therebetween. The piston 26 slidably operates in the larger chamber 11, and means is provided for a restricted flow of fluid from the inlet chamber to the upper end area of the piston such as the grooves 31 on the periphery of said piston. The diameter of the intermediate reduced section 27 is less than the I. D. of the inlet chamber 12 so as to provide a suitable fluid flow area thereabout. At the upper end of the outlet chamber 13 is fitted a valve seat 32 against which the valve 30 cooperates to effectively control the major portion of the fluid flow through the valve device.

The means providing the more sensitive control of my valve device will now be described. A small bore or passageway 33 in the valve member 25 opens through the upper surface of the piston 26 and extends axially downwardly into the member 25 to an intermediate position of the stem 29 where it opens through a lateral port 34 into the outlet chamber 13. In the closed position of the valve member 25 the pilot valve 18 closes the upper end of passageway 33 so that the pressure on the upper area of the piston 26 builds up to line pressure and holds the main valve closed.

A tubular sleeve 35 is slidably fitted on the stem 29 and is provided with an intermediate circumferential baffle flange 36 of a diameter substantially less than the I. D. of the outlet chamber 13. The sleeve 35 is normally held on the stem 29 in a position above the lateral port 34 by a light coiled compression spring 37 having one end engaging the baffle flange 36 and its opposite end supported by a nut 38 adjustable on a threaded extension 39 of the stem 29. The sleeve 35 with its flange 36 is thus responsive to the rate of fluid flow through the chamber 13 and may be considered a sensing sleeve so that when the flow increases beyond the desired amount the sleeve moves gradually over the port 34. A suitable nipple 40 may be attached to the lower end of the body 10 to which a hose may be connected for directing the controlled fluid to a domestic appliance unit.

In the operation of the device, as soon as the solenoid 19 is energized the plunger 18 will be elevated, unsealing the upper end of the passageway 33 and leaving the valve member 25 free to float axially in its respective chambers. Fluid flows from the upper chamber through the passageway 33 to the outlet chamber faster than it enters through the restricted grooves 31 thus relieving the pressure on the upper side of the piston 26. The pressure on the annular area 28 will cause the piston 26 to rise within its chamber 11 to a position wherein the fluid pressure on opposite sides of the piston will balance each other while fluid is passing through the bore 33 out through the port 34 into the outlet chamber 13 below the sensing sleeve 35. When the rate of fluid flowing through the chamber 13 increases beyond a predetermined amount the sensing sleeve will move downwardly against the influence of the spring 37 and meter the fluid discharging from the port 34. Shutting off or partially restricting the free flow of fluid through port 34 will consequently increase the fluid pressure in chamber 11 above the piston 26 and cause the valve member 25 to move downwardly to a position wherein the fluid pressures on opposite sides of the piston head will balance each other and restrict the flow of fluid past the valve seat 32.

It will thus be seen that the primary regulation of the flow control valve is by a fluid pressure actuated device rather than by a baffle-like member in the outlet. This fluid pressure actuated member may be the piston and cylinder herein shown and described, or it may be a diaphragm such as has been employed in some flow control valves. Since the member which is responsive to the rate of flow of fluid in the outlet passage needs only to control the flow out of the main fluid pressure actuating device, it can be made light and sensitive to small variations in the rate of flow and thus the valve can be made to give uniform delivery of fluid throughout a very wide range of pressures. This device is conveniently combined with the passage controlled by the solenoid valve which initiates the operation of the flow control valve.

I claim:

1. A fluid flow control valve comprising a valve body having a valve seat, an inlet chamber and an outlet chamber, a movable valve cooperating with said seat, a fluid pressure actuated member in said inlet chamber located above and connected to said valve and having a bottom area in communication with the inlet chamber and an upper area larger than the bottom area, means providing for a restricted flow of fluid from the inlet to said upper area of said member, a passageway through the valve leading from the upper area and opening through a port to the outlet chamber, and means carried by and movable relative to the valve in response to the rate of flow through the outlet chamber for progressively controlling said port as the rate of flow increases.

2. A fluid flow control valve as defined in claim 1 wherein a solenoid operated valve opens and closes the entrance to the passageway leading from the upper area of the fluid pressure actuated member to the outlet chamber for initiating the operation of the flow control valve.

3. A fluid flow control valve comprising a valve body having a valve seat, an inlet chamber and an outlet chamber on opposite sides of said seat, a valve movable toward and away from said seat to control the flow of fluid, a fluid pressure actuated member located in said inlet chamber above and connected to said valve having a bottom area in unrestricted connection with the inlet chamber and an upper area communicating with the inlet chamber through a restricted passage, a stem depending from said valve into the outlet chamber, a passageway leading from said upper area through said valve and opening through a lateral port in said stem, and yieldable means slidable on said stem for controlling the area of said port, said means presenting a baffle-like element in the path of the water flowing through the outlet chamber whereby increased flow will cause said device to close said port in proportion to the rate of flow.

4. A fluid flow control valve comprising a valve body having a valve seat, a floating valve member guided in said body, a valve carried thereby adapted to move toward and away from said seat, a piston carried by the valve member in spaced relation to and above the valve and having an annular area around the valve connecting with the inlet so as to be constantly subjected to inlet pressure tending to move the valve to open position, said body having an enlarged bore in which said piston moves, means for closing the upper end of said bore means providing for a restricted flow of water to the end area thereof opposed to said annular area, said valve body having a bore below the valve providing an outlet chamber, a stem depending from the valve into said outlet chamber, a passageway leading from said end area of the piston through the valve member and opening through a lateral port in said stem to the outlet chamber, a port-controlling sleeve surrounding said stem and having a baffle flange in the path of water flowing through the valve, a spring tending to hold said sleeve in port-open position against the fluid flow, so that when the rate of flow increases beyond the desired rate the sleeve will move at least partially over said port resulting in a build-up of pressure on the end area of the piston tending to move the valve toward closed position.

5. A fluid flow control valve as defined in claim 4 together with means for adjusting the resistance of said spring against the action of fluid flowing around the port-controlling sleeve.

References Cited in the file of this patent

UNITED STATES PATENTS

| | | |
|---|---|---|
| 2,251,441 | Dillman | Aug. 5, 1941 |
| 2,584,418 | Branson | Feb. 5, 1952 |
| 2,633,869 | Plank | Apr. 7, 1953 |